(12) United States Patent
Zhao et al.

(10) Patent No.: US 10,448,162 B2
(45) Date of Patent: Oct. 15, 2019

(54) SMART HEADPHONE DEVICE PERSONALIZATION SYSTEM WITH DIRECTIONAL CONVERSATION FUNCTION AND METHOD FOR USING SAME

(71) Applicants: Ping Zhao, Beijing (CN); Ei-Eu Chang, Taipei (TW)

(72) Inventors: Ping Zhao, Beijing (CN); Ei-Eu Chang, Taipei (TW)

(\*) Notice: Subject to any disclaimer, the term of this patent is extended or adjusted under 35 U.S.C. 154(b) by 0 days.

(21) Appl. No.: 15/997,906

(22) Filed: Jun. 5, 2018

(65) Prior Publication Data

US 2018/0367900 A1 Dec. 20, 2018

(30) Foreign Application Priority Data

Jun. 14, 2017 (TW) .............................. 106119728 A

(51) Int. Cl.
*H04R 5/02* (2006.01)
*H04R 1/10* (2006.01)
*H04R 5/04* (2006.01)
*H04M 1/725* (2006.01)
*H04R 1/40* (2006.01)
*H04R 5/033* (2006.01)
*H04R 25/00* (2006.01)

(52) U.S. Cl.
CPC ............ *H04R 5/04* (2013.01); *H04M 1/7253* (2013.01); *H04R 1/1008* (2013.01); *H04R 1/40* (2013.01); *H04R 1/406* (2013.01); *H04R 5/033* (2013.01); *H04R 25/70* (2013.01); *H04R 2201/107* (2013.01); *H04R 2430/01* (2013.01); *H04R 2430/21* (2013.01)

(58) Field of Classification Search
CPC .......... H04R 5/04; H04R 1/1008; H04R 1/40; H04R 1/406; H04M 1/7253
USPC ................................................... 381/310, 74
See application file for complete search history.

(56) References Cited

U.S. PATENT DOCUMENTS

| | | | | |
|---|---|---|---|---|
| 2010/0119093 A1* | 5/2010 | Uzuanis | .................. | H04R 25/70 381/312 |
| 2012/0020485 A1* | 1/2012 | Visser | .................... | H04R 3/005 381/57 |
| 2015/0293655 A1* | 10/2015 | Tan | ........................ | G06F 3/0486 715/727 |
| 2016/0234606 A1* | 8/2016 | Selig | ..................... | H04R 25/50 |

(Continued)

*Primary Examiner* — Vivian C Chin
*Assistant Examiner* — Ammar T Hamid
(74) *Attorney, Agent, or Firm* — Rosenberg, Klein & Lee

(57) ABSTRACT

Disclosed are a smart headphone device personalization system with directional conversation function and a method for using the system. A user downloads a headphone personalization application program unit from the server device for installation in a mobile device that is then paired with the smart headphone device. The user enters corresponding data through a register module. The user wears the smart headphone device to allow a hearing inspection module to inspect hearing capabilities of ears and generate an inspection result. An automatic compensation unit and a manual compensation module make compensation according to the inspection result. Finally, the user adjusts the sound effect mode through a preference setting module to complete personalization of the smart headphone device. A directional conversation function is provided with the smart headphone device to receive and magnify a sound from a front side and the user can clearly hear the sound from the front side.

20 Claims, 14 Drawing Sheets

(56) References Cited

U.S. PATENT DOCUMENTS

| | | | |
|---|---|---|---|
| 2017/0337270 A1* | 11/2017 | Koch | H04L 12/1859 |
| 2018/0249263 A1* | 8/2018 | Raz | H04R 25/30 |
| 2018/0262849 A1* | 9/2018 | Farmani | H04R 1/1083 |

* cited by examiner

| user name | |
|---|---|
| password | |
| re-entry of password | |
| gender | |
| age | |
| occupation | |
| serial number of smart headphone device | | confirm

FIG.3

|  | 63Hz | 125Hz | 250Hz | 500Hz | 1kHz | 2kHz | 4kHz | 8kHz | 16kHz |
|---|---|---|---|---|---|---|---|---|---|
| 60db | | | | | | | | | |
| 55db | | | | | | | | | |
| 50db | | | | | | | | | |
| 45db | | | | | | | | | |
| 40db | | | | | | | | | |
| 35db | | | | | | | | | |
| 30db | | | | | | | | | |
| 25db | | | | | | | | | |
| 20db | | | | | | | | | |
| 15db | | | | | | | | | |
| 10db | | | | | | | | | |
| 5db | | | | | | | | | |
| 0db | | | | | | | | | | left ear heard

|       | 63Hz | 125Hz | 250Hz | 500Hz | 1kHz | 2kHz | 4kHz | 8kHz | 16kHz |
|-------|------|-------|-------|-------|------|------|------|------|-------|
| 60db  |      |       |       |       |      |      |      |      |       |
| 55db  |      |       |       |       |      |      |      |      |       |
| 50db  |      |       |       |       |      |      |      |      |       |
| 45db  |      |       |       |       |      |      |      |      |       |
| 40db  |      |       |       |       |      |      |      |      |       |
| 35db  |      |       |       |       |      |      |      |      |       |
| 30db  |      |       |       |       |      |      |      |      |       |
| 25db  |      |       |       |       |      |      |      |      |       |
| 20db  |      |       |       |       |      |      |      |      |       |
| 15db  |      |       |       |       |      |      |      |      |       |
| 10db  |      |       |       |       |      |      |      |      |       |
| 5db   |      |       |       |       |      |      |      |      |       |
| 0db   |      |       |       |       |      |      |      |      |       | right ear heard

FIG.4D

SMART HEADPHONE DEVICE PERSONALIZATION SYSTEM WITH DIRECTIONAL CONVERSATION FUNCTION AND METHOD FOR USING SAME

FIELD OF THE INVENTION

The present invention relates to a smart headphone personalization system and a method for using the system, and more particular to a smart headphone personalization system with directional conversation function and a method for using the system that establish and configure a smart headphone device exclusively for the user according to the hearing condition and preference of the user and provide the user with a directional conversation function through the already-personalized smart headphone device.

BACKGROUND OF THE INVENTION

With the continuous progress of the network technology, more and more people use a personal mobile device to listen to music on line or to download audio files to a personal mobile device for subsequent listening. To allow a person to listen to music in a non-disturbed environment at any time and any place, a headphone is becoming an accessory or device that is necessary to a personal mobile device.

To ensure a comfortable condition of listening to music, a person may adjust the broadcasting volume of the headphone to achieve such a purpose. However, some of the known headphone devices only allow a person to make volume adjustment for both left and right ears at the same time, but no concern has been placed on the condition that the hearing capability may be different for the left and right ears, similar to the vision capability being different for the left and right eyes. As a result of such a situation, to prevent damage or loss of hearing, the broadcasting volume must be properly adjusted for different hearing capabilities. However, repeated volume adjustment for the left and right ears separately for each time of use would be very inconvenient and troublesome of the user.

Further, the level of perception of hearing may be different for different persons. Some like high-frequency sound, while the other love heavy base sound. Headphones that are currently known are generally incapable of adjustment that really suits the needs of the users.

Further, when people chat fact to face, the contents of talking may be affected or interfered with by the sounding sounds and are not clearly heard. Oftentimes, people need to repeat what has been spoken for one or more time in order to have each other realize the contents of talk. This causes inconvenience of chatting.

In view of the above, it is now a challenging issue to provide a smart headphone personalization system with directional conversation function and a method for using the system that establish and configure a smart headphone device exclusively for a specific user according to the hearing condition and preference of the user and provide the user with a directional conversation function through the already-personalized smart headphone device.

SUMMARY OF THE INVENTION

The primary objective of the present invention is to provide a smart headphone device personalization system with directional conversation function and a method for using the system, in which a server device, a headphone personalization application program unit, a mobile device, and a smart headphone device are operated according to the way of use thereof to establish and configure a smart headphone device exclusively for the user according to the hearing condition and preference of the user, wherein when the user wears the personalized smart headphone device to listen to music, since issues caused by hearing difference between the two ears of the user have been overcome, it is not necessary to frequently adjust the sound volume and it is also possible to avoid any consequence of deafness caused by listing to music with improper sound volume applying to the ears, and the frequency band of music listening can be adjusted according to the user's preference to allow the user to listen to music in a comfortable and easy condition, and in addition, the directional conversation function of the personalized smart headphone device is operable to magnify the voice of a person in conversation in front of the user so as to allow the user to clearly hear the conversation contents of the person and thus improving convenience of conversation.

Thus, to achieve the above objective, the present invention provides a smart headphone device personalization system with directional conversation function, which comprises a server device, which comprises therein a headphone personalization application program unit, the headphone personalization application program unit comprising a register module, a hearing inspection module, a manual compensation module, a preference setting module, and a function selection module, wherein: the register module allows a user to enter corresponding data for registration; the hearing inspection module allows the user to carry out hearing inspection and generates an inspection result; the manual compensation module allows the user to carry out manual compensation according to the inspection result; the preference setting module allows the user to adjust a sound effect mode according to personal preference, so that when the setting is done, a personalized setting that is fit to the hearing of the user is provided; and the function selection module, which allows a user to make selection of functions provided by a smart headphone device, wherein the functions comprise a directional conversation function; a mobile device, which is connected, through a first transmission unit, to a network to downward, from the server device, the headphone personalization application program unit for installation in the mobile device; and the smart headphone device comprising: a central processing unit; a second transmission unit, which is electrically connected with the central processing unit in order to receive, through pairing between the second transmission unit and the first transmission unit, an instruction transmitted from the mobile device for transmission to the central processing unit, such that the central processing unit converts the instruction into a corresponding signal; a headphone unit, which is electrically connected with the central processing unit so that the headphone unit gives off the corresponding signal to be listened to by the user; an automatic compensation unit, which is electrically connected with the central processing unit and carries out automatic compensation according to the inspection result generated by the hearing inspection module; a storage unit, which is electrically connected with the central processing unit for storing the personalized setting in the storage unit; a power supply unit, which is electrically connected with the central processing unit to supply electrical power necessary for the smart headphone device; at least a noise sampling unit, which is adapted to receive and collect an external environmental noise to carry out inspection of the environmental noise; at least one arrayed sound receiving unit, which is electrically connected to the central processing unit and is arranged on the smart headphone device such that the arrayed sound receiving unit, faces a front side of the user to receive and collect, a sound front the front side of the user; a signal processing unit, which is electrically connected to the noise sampling unit, the arrayed sound receiving unit, and the central processing unit to convert the environmental noise into a first signal, converting the sound from the front side of the user into a second signal, and transmitting the first and second signals to the central processing unit; and a signal magnifying unit, which is electrically connected with the central processing unit and the headphone unit to magnify the second signal and feed the magnified second signal to the headphone unit to be broadcast through the headphone unit, so that the user is allowed to clearly hear the sound from the front side of the user.

In the above embodiment, the arrayed sound receiving unit comprises a plurality of sound receiver microphones of directivity, the sound receiver microphones being arranged on a brace member of the smart headphone device to receive and collect the sound from the front side of the user.

In the above embodiment, the sound receiver microphones are cardioids microphones.

In the above embodiment, the smart headphone device comprises a circumaural headphone.

In the above embodiment, the smart headphone device further comprises a satellite positioning unit, the satellite positioning unit being electrically connected with the central processing unit, the satellite positioning unit being operable to acquire a site where the smart headphone device is currently located for subsequent transmission to the central processing unit.

In the above embodiment, the register module comprises at least one data field for data entry by a user.

In the above embodiment, the data field comprises user name, password, re-entry of password, gender, age, occupation and smart headphone device serial number.

In the above embodiment, the functions provided by the smart headphone device further comprises an easy listening function.

The present invention also provides a method for using a smart headphone device personalization system with directional conversation function, which comprises at least the following steps: Step 1: a user downloading a headphone personalization application program unit from a server device for installation in a mobile device for pairing the mobile device with a smart headphone device to complete a pairing procedure; Step 2: conducting a registration procedure, wherein the user enters corresponding data through a register module of the mobile device; Step 3: conducting a hearing inspection procedure, wherein the user wears the smart headphone device and a hearing inspection module of the mobile device is put into operation to inspect hearing capabilities of left and right ears of the user and generate an inspection result; Step 4: conducting a hearing compensation procedure, wherein an automatic compensation unit of the smart headphone device is first operated to automatically carry out compensation according to the inspection result and then, the user operates a manual compensation module of the mobile device to carry out compensation; Step 5: conducting a preference setting procedure, wherein the user operates a preference setting module of the mobile device to adjust a sound effect mode, so that after the setting is done, personalization of the smart headphone device is completed; and Step 6: conducting a function selection procedure to allow the user to make selection, through a function selection module, among functions provided by the smart headphone device for selecting a directional conversation function so that the already-personalized smart headphone device is operable to receive, through at least one arrayed sound receiving unit arranged on the smart headphone device, a sound from a front side of the user to be converted, through a signal processing unit, into a second signal, which is transmitted by a central processing unit to a signal magnifying unit to be subsequently broadcast through a headphone unit to allow the user to clearly hear the sound from the front side of the user.

In the above embodiment, the arrayed sound receiving unit comprises a plurality of sound receiver microphones of directivity, the sound receiver microphones being arranged on a brace member of the smart headphone device to receive and collect the sound from the front side of the user.

In the above embodiment, the sound receiver microphones are cardioids microphones.

In the above embodiment, the smart headphone device comprises a circumaural headphone.

In the above embodiment, the register module comprises at least one data field for data entry by a user.

In the above embodiment, the data field comprises user name, password, re-entry of password, gender, age, occupation and smart headphone device serial number.

In the above embodiment, the hearing inspection procedure further comprises a standby state and an inspection state.

In the above embodiment, in the standby state, a level of volume of the smart headphone device is turned down to a minimum value and the sampling unit of the smart headphone device is adjusted to a predetermined position in order to detect an environmental noise, a signal processing unit of the smart headphone device converting the environmental noise into a first signal to be transmitted to a central processing unit of the smart headphone device, a second transmission unit of the smart headphone device transmitting the first signal to a mobile device, wherein when the environmental noise is detected to be of a relative low level, switching is made to the inspection state, or otherwise, when the environmental noise is detected to be of a relatively high level, no switching is made to the inspection state.

In the above embodiment, in the inspection state, the user hears through the smart headphone device audio signals issued from the mobile device, wherein the user is allowed to hear the audio signal each time with just one ear, wherein the user, upon hearing the audio signal, actuates a confirmation button on the mobile device to issue a confirmation message, and the mobile device subsequently issue a next one of audio signal having a different frequency or volume, wherein after multiple times of inspection, an inspection result is displayed on the mobile device and the inspection result is stored in the storage unit and uploaded through the mobile device to the server device for storage.

In the above embodiment, after the inspection of both ears of the user is done and the inspection result is generated, then the hearing compensation procedure is conducted, wherein the hearing compensation procedure further comprises auditory curve compensation, auditory threshold sensitivity compensation, balance compensation, and position recognition compensation, wherein the auditory curve compensation and the auditory threshold sensitivity compensation are automatic compensation conducted with the automatic compensation unit and the balance compensation and the position recognition compensation are compensation conducted with the manual compensation module by the user.

In the above embodiment, the sound effect mode comprises news mode, classic mode, fashion mode, rock-and-roll mode, and heavy bass mode to be selected by the user.

In the above embodiment, the functions provided by the smart headphone device further comprise an easy listening function.

BRIEF DESCRIPTION OF THE DRAWINGS

The present invention will be apparent to those skilled in the art by reading the following description of preferred embodiments thereof with reference to the drawings, in which:

FIG. 3 is a schematic view illustrating a registration module of FIG. 2;

FIGS. 4A-4D are schematic views illustrating a hearing inspection module of FIG. 2;

DETAILED DESCRIPTION OF THE PREFERRED EMBODIMENTS

Figure 1:
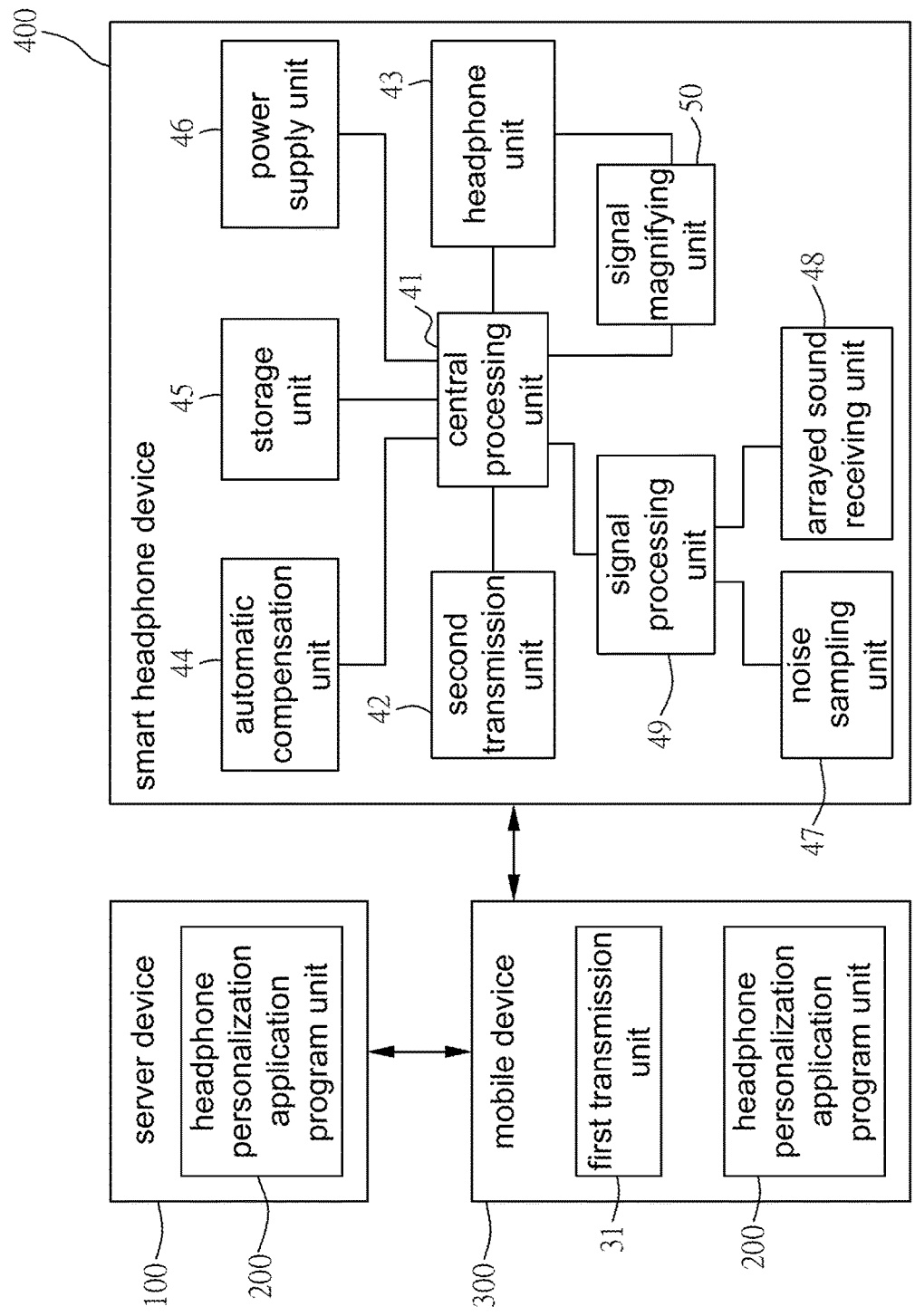
FIG. 1 is a schematic view illustrating architecture of a smart headphone device personalization system with directional conversation function according to the present invention.
Figure 2:
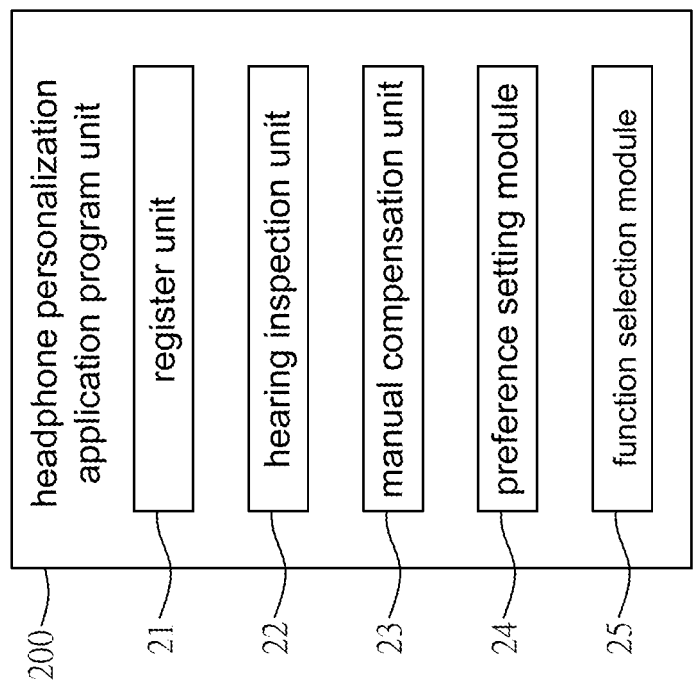
FIG. 2 is a schematic view a function module of a headphone personalization application program unit according to the present invention.
Figure 4A:
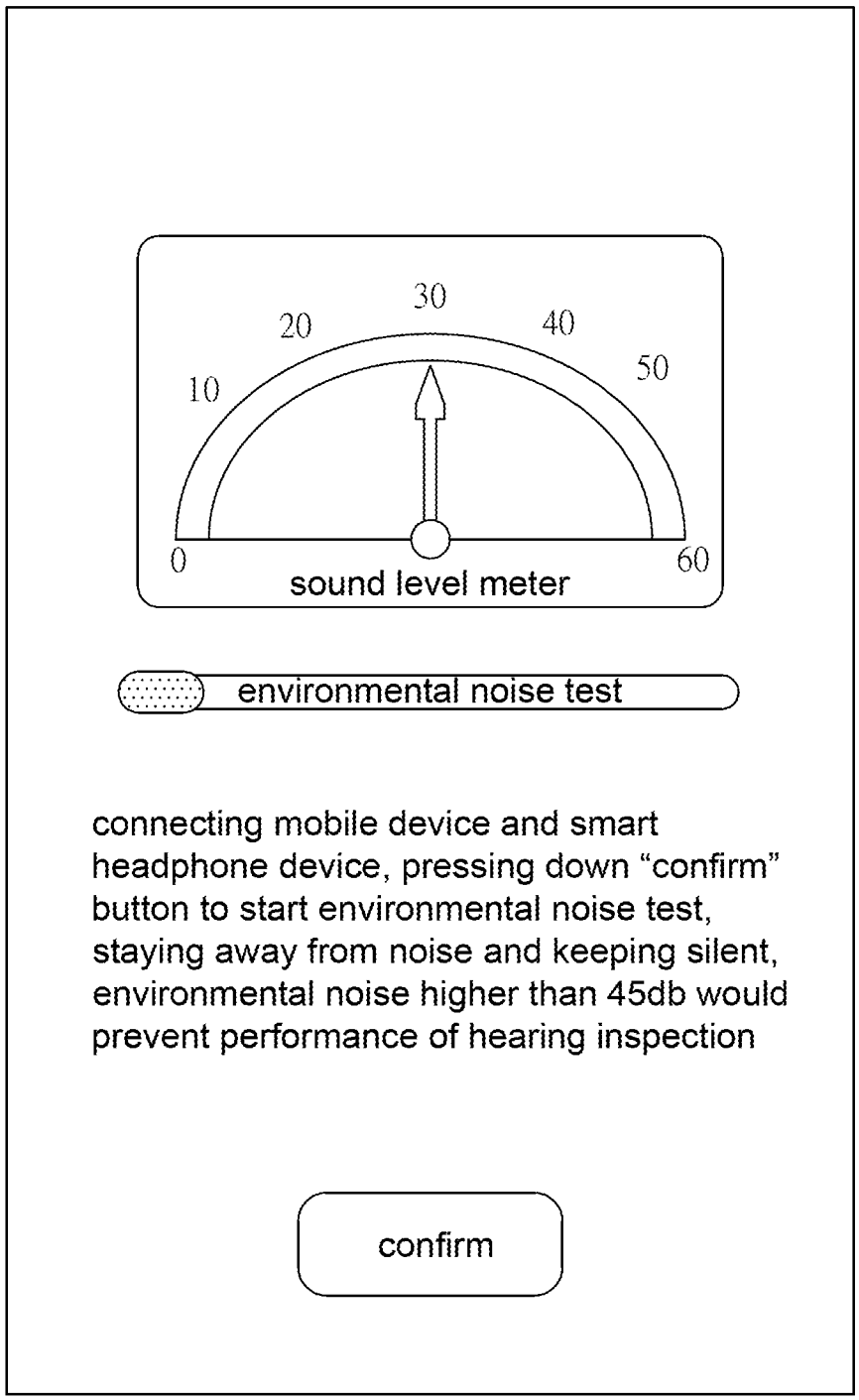
Figure 4B:
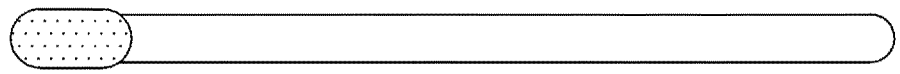
Figure 4C:
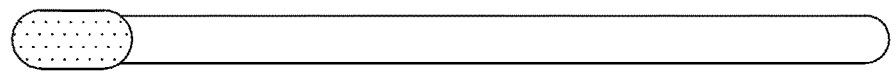
Figure 4D:
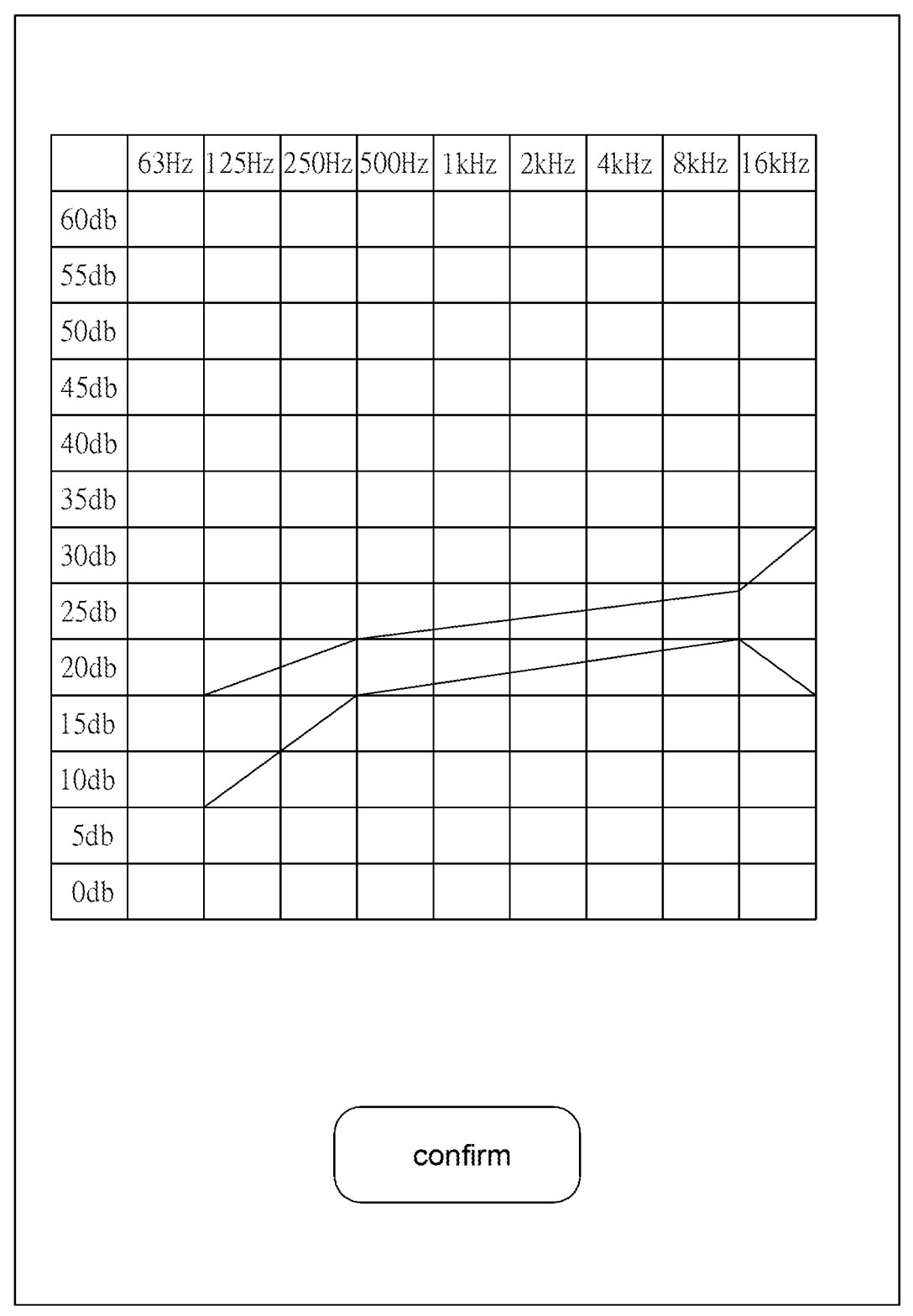
Figure 5A:
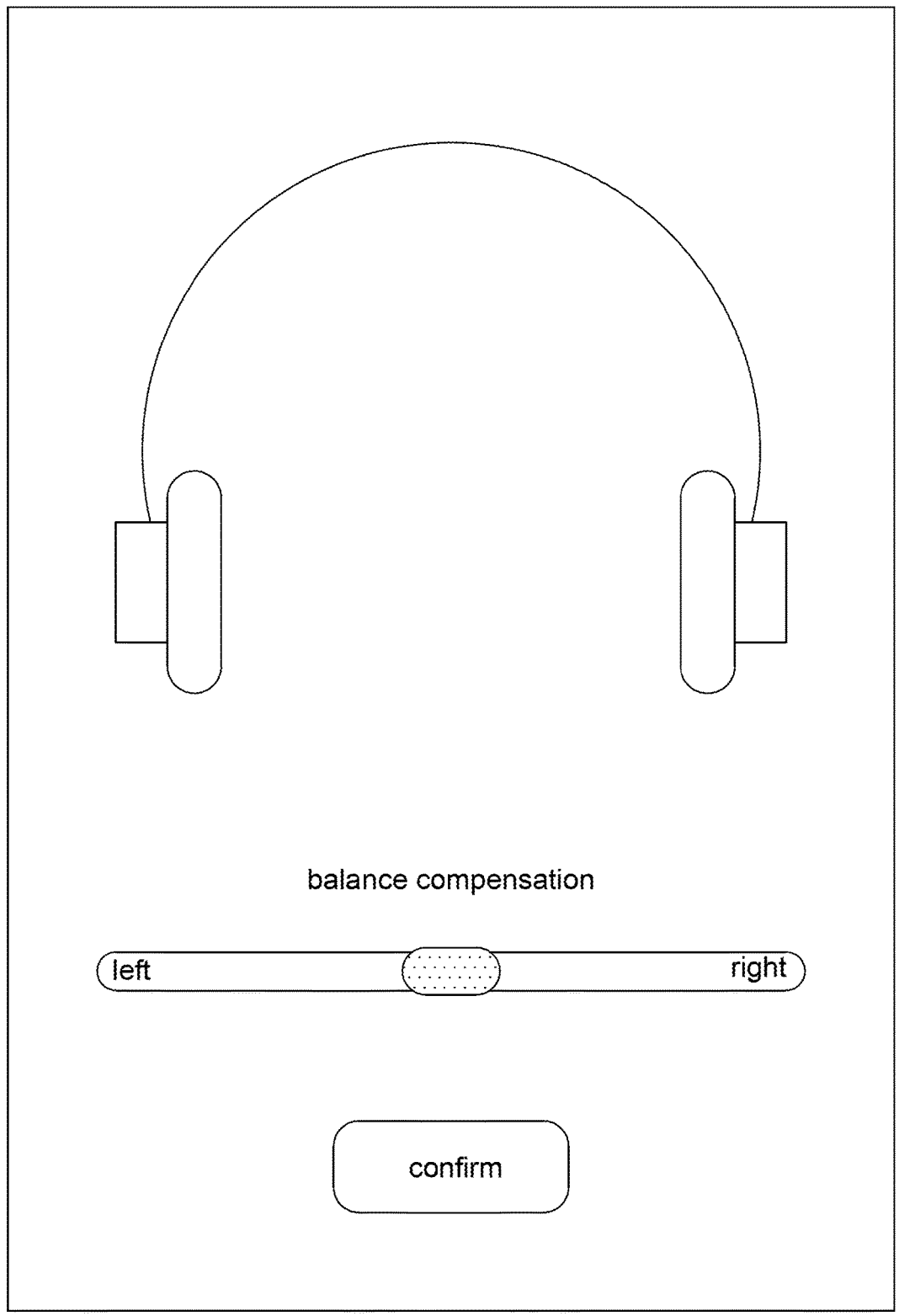
FIGS. 5A-5C are schematic views illustrating a manual compensation module of FIG. 2.
Figure 5B:
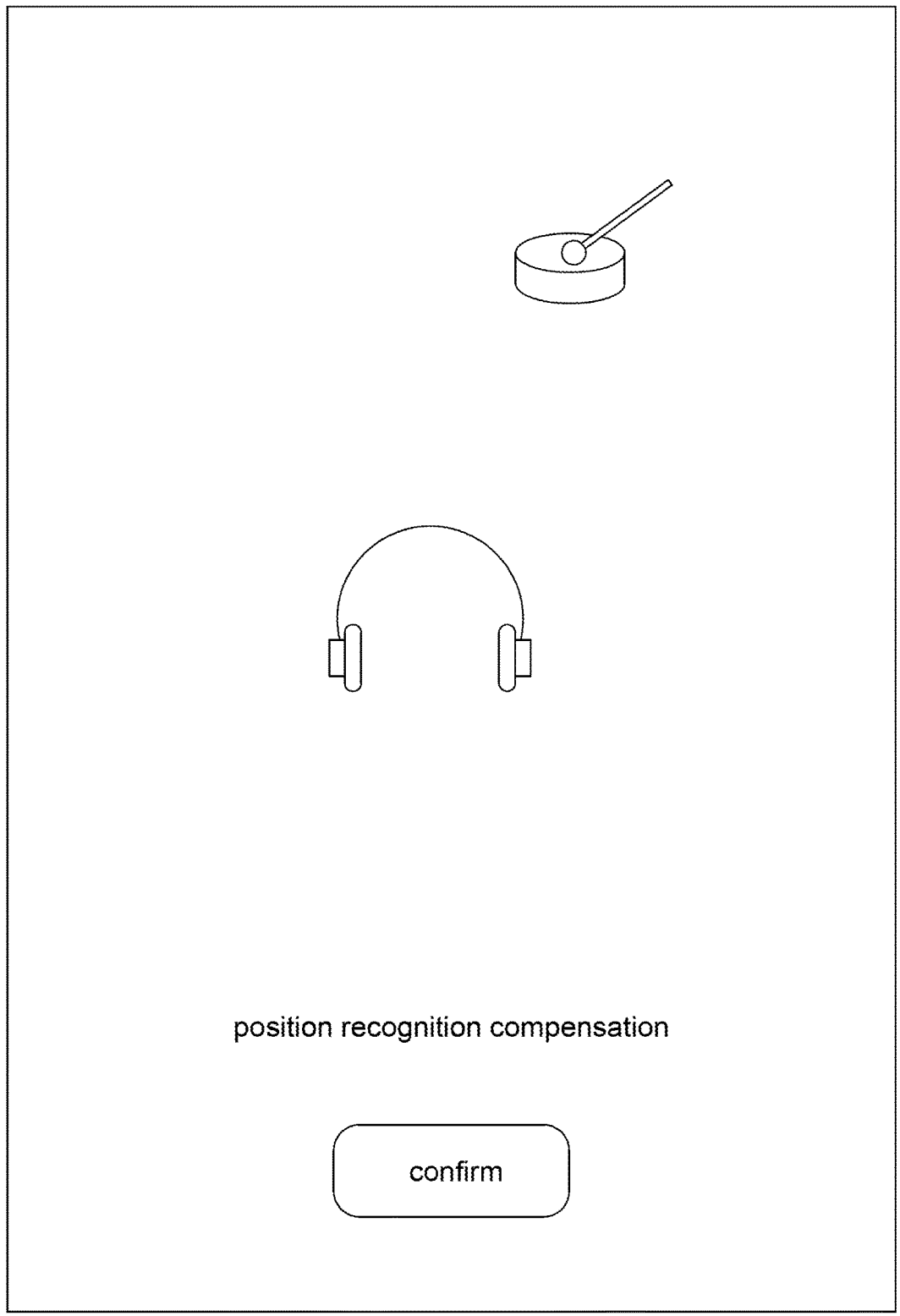
Figure 5C:
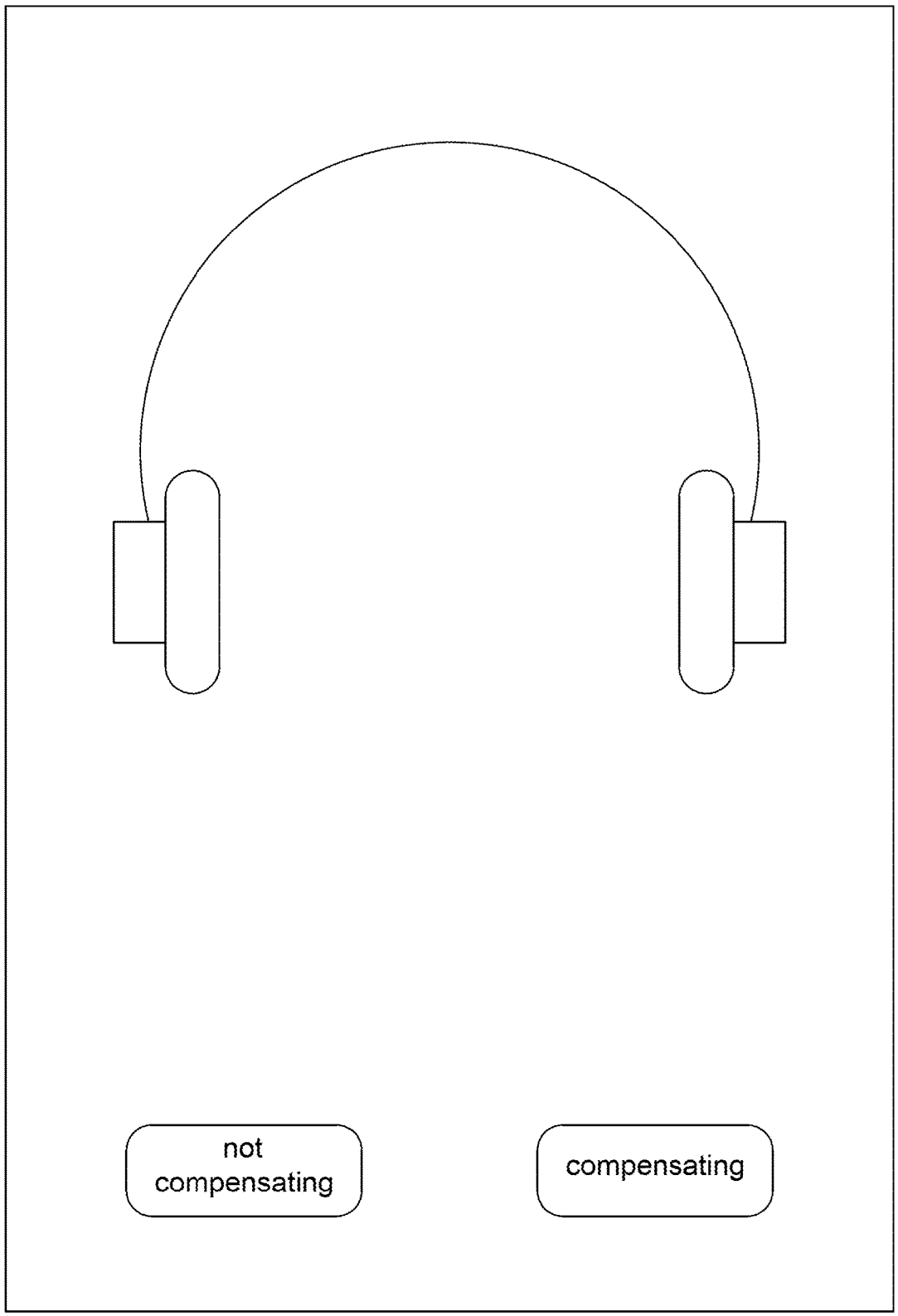
Figure 6:
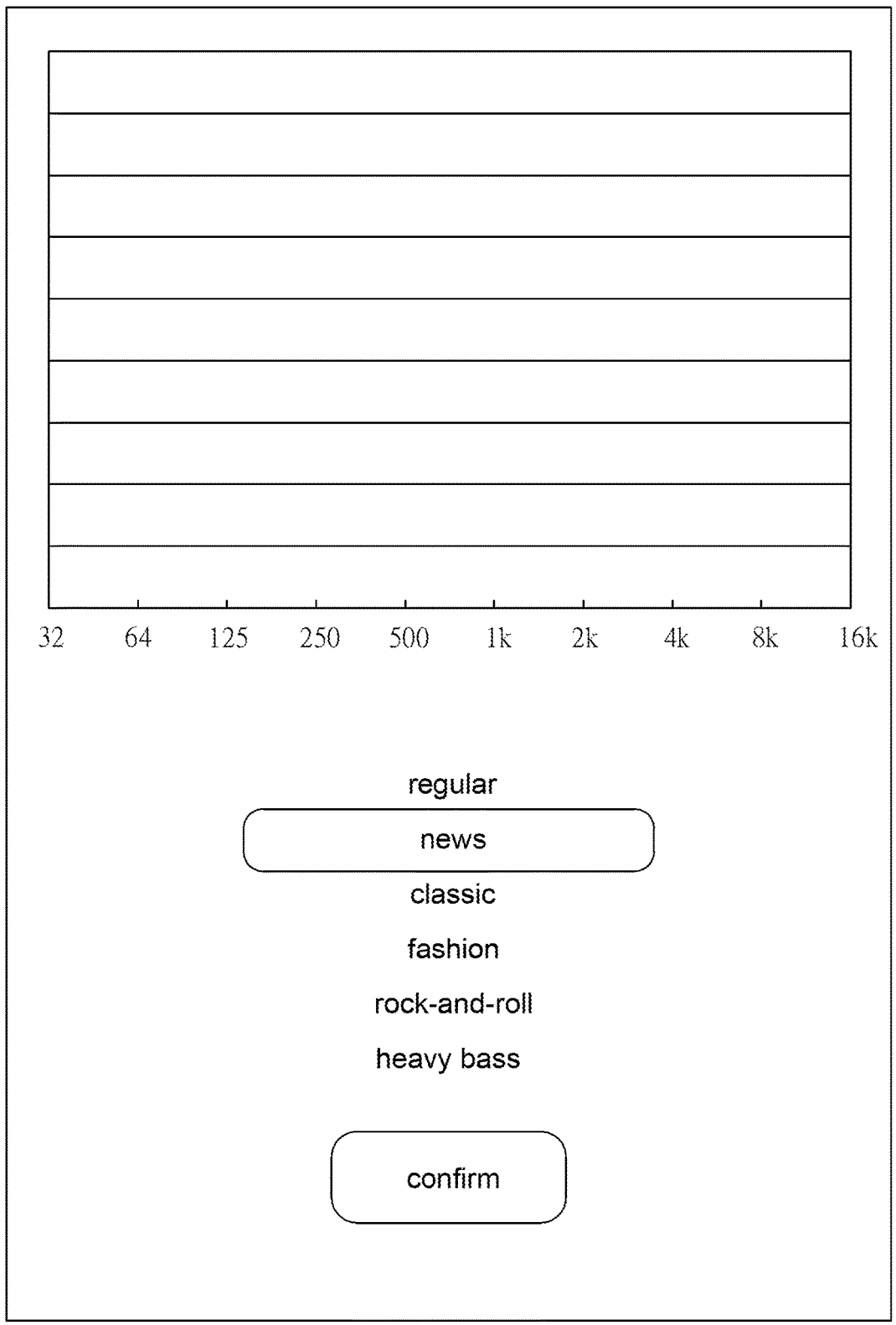
FIG. 6 is a schematic view illustrating a preference setting module of FIG. 2.
Figure 7:
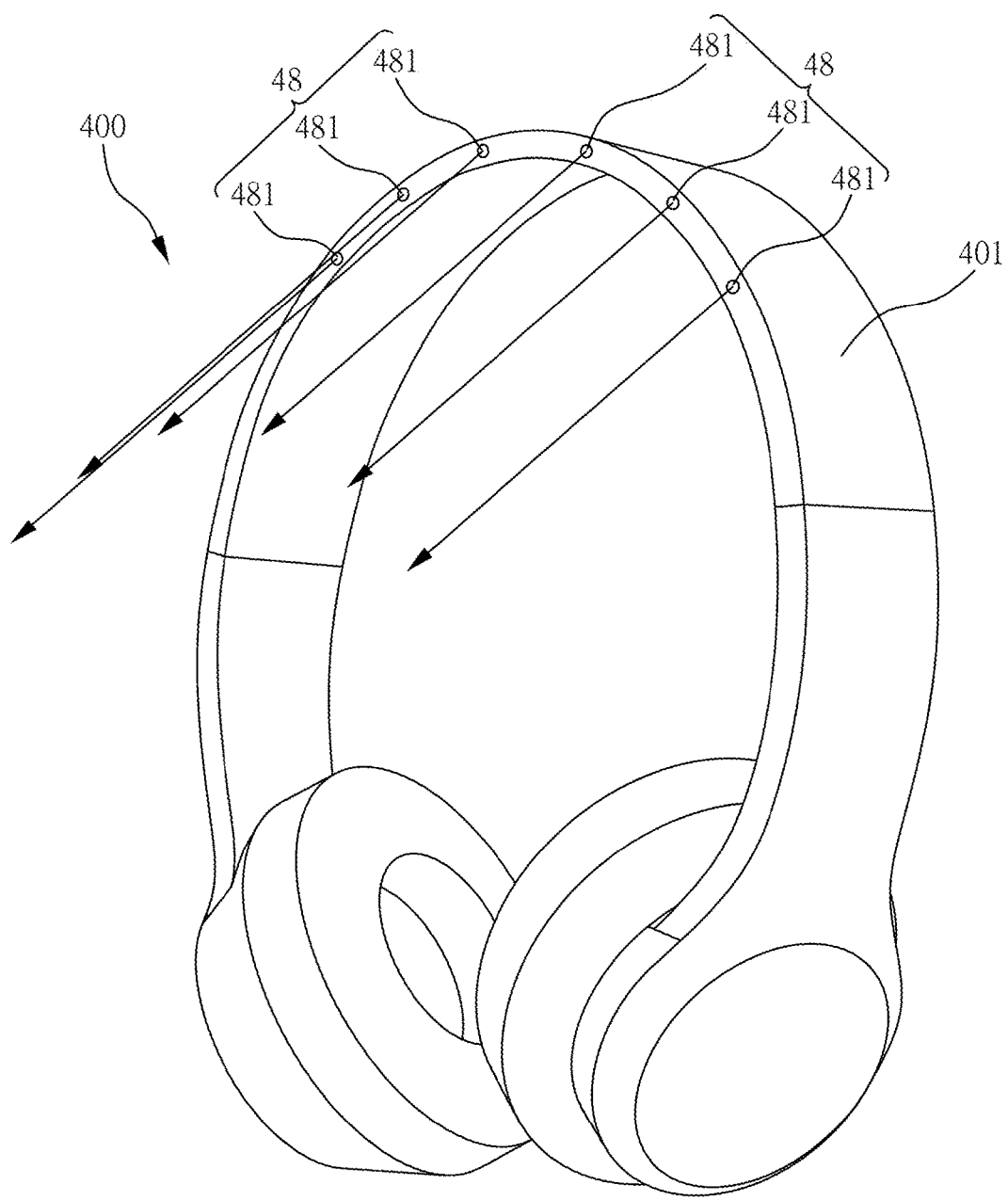
FIG. 7 is a perspective view illustrating the smart headphone device according to the present invention.

With reference to FIGS. 1-7, a smart headphone device personalization system with directional conversation function according to the present invention comprises:

a server device 100, the server device 100 comprising a headphone personalization application program unit 200 stored therein, the headphone personalization application program unit 200 comprising a register module 21, a hearing inspection module 22, a manual compensation module 23, a preference setting module 24, and a function selection module 25, wherein the register module 21 allows a user to enter corresponding data for registration (wherein, as shown in FIG. 3, the register module 21 comprises at least one data field to data entry by the user, wherein the data field comprises user name, password, re-entry of password, gender, age, occupation, and serial number of a smart headphone device 400); the hearing inspection module 22 allows the user to conduct hearing inspection and generates an inspection result (as shown in FIGS. 4A-4D); the manual compensation module 23 allows the user to do manual compensation for the inspection result (as shown in FIGS. 5A-5C); the preference setting module 24 allows the user to adjust a sound effect mode according to personal preference (as shown in FIG. 6), whereby after the process is completed, a personalized setting that is specifically fit for the user's hearing; and the function selection module 25 allows the user make selection among functions provided by the smart headphone device 400, wherein the functions include a directional conversation function and also include an easy listening function;

a mobile device 300 (which can be a mobile device that is for example a smart phone, a tablet computer, and the likes), which is connected through a first transmission unit 31 to a network in order to download the headphone personalization application program unit 200 from the server device 100 for installation in the mobile device 300; and the smart headphone device 400, which comprises a central processing unit 41; a second transmission unit 42, which is electrically connected with the central processing unit 41 in order to receive, through pairing between the second transmission unit 42 and the first transmission unit 31, an instruction transmitted from the mobile device 300 for transmission to the central processing unit 41, such that the central processing unit 41 converts the instruction into a corresponding signal; a headphone unit 43, which is electrically connected with the central processing unit 41 so that the headphone unit 43 gives off the corresponding signal to be listened to by the user; an automatic compensation unit 44, which is electrically connected with the central processing unit 41 and carries out automatic compensation according to the inspection result generated by the hearing inspection module; a storage unit 45, which is electrically connected with the central processing unit 41 for storing the personalized setting in the storage unit; and a power supply unit 46, which is electrically connected with the central processing unit 41 to supply electrical power necessary for the smart headphone device 400; at least noise sampling unit 47, which collects environmental noises to carry out inspection of the environmental noises; least one arrayed sound receiving unit 48, which is electrically connected to the central processing unit 41 and is arranged on the smart headphone device 400 such that the arrayed sound receiving unit 48 faces toward a front side of the user to collect and receive sounds from the front side of the user; a signal processing unit 49, which is electrically connected to the noise sampling unit 47, the arrayed sound receiving unit 48, and the central processing unit 41 to convert the environmental noises into a first signal and to convert the sounds from the front side of the user into a second signal and to transmit the first and second signals to the central processing unit 41; and a signal magnifying unit 50, which is electrically connected to the central processing unit 41 and the headphone unit 43 to magnify the second signal and feed the magnified second signal to the headphone unit 43 to be broadcast with the headphone unit 43 so that the user may clearly hear the sounds from the front side of the user. However, as shown in FIG. 7, the arrayed sound receiving unit 48 comprises a plurality of sound receiver microphones 481 of directivity (such as a cardioids microphone) that are fixed on a brace member 401 of the smart headphone device 400 (such as a circumaural headphone) to collect and receive the sounds from the front side of the user.

Thus, the user is allowed to use the smart headphone device personalization system to establish or configure a smart headphone device exclusively for himself or herself. When the user wears the personalized smart headphone device in connection with a sound playing device, such as a mobile device, a tabletop computer, a notebook computer, or a portable playing device, to listen to music or radio broadcasting, since any issue caused by hearing difference between the two ears of the user has been overcome, it is not necessary to constantly adjust the sound volume and it is also possible to avoid any consequence of deafness caused by listing to music with improper sound volume applying to the ears, and the frequency band of music listening can be adjusted according to the user's preference to allow the user to listen to music in a comfortable and easy condition. Further, by means of the directional conversation function of the personalized smart headphone device, the sounds from the front side of the user can be magnified to allow the user to clearly hear the contents of talk of a person in conversation therewith so as to enhance convenience of conversation.

In addition, the smart headphone device 400 may further comprise a satellite positioning unit (not shown), wherein the satellite positioning unit is electrically connected with the central processing unit 41, so that the satellite positioning unit may acquire the site where the smart headphone device 400 is currently located for subsequent transmission to the central processing unit 41, whereby when the user wears and uses the smart headphone device 900, the site of the user can be clearly identified.

Figure 8:
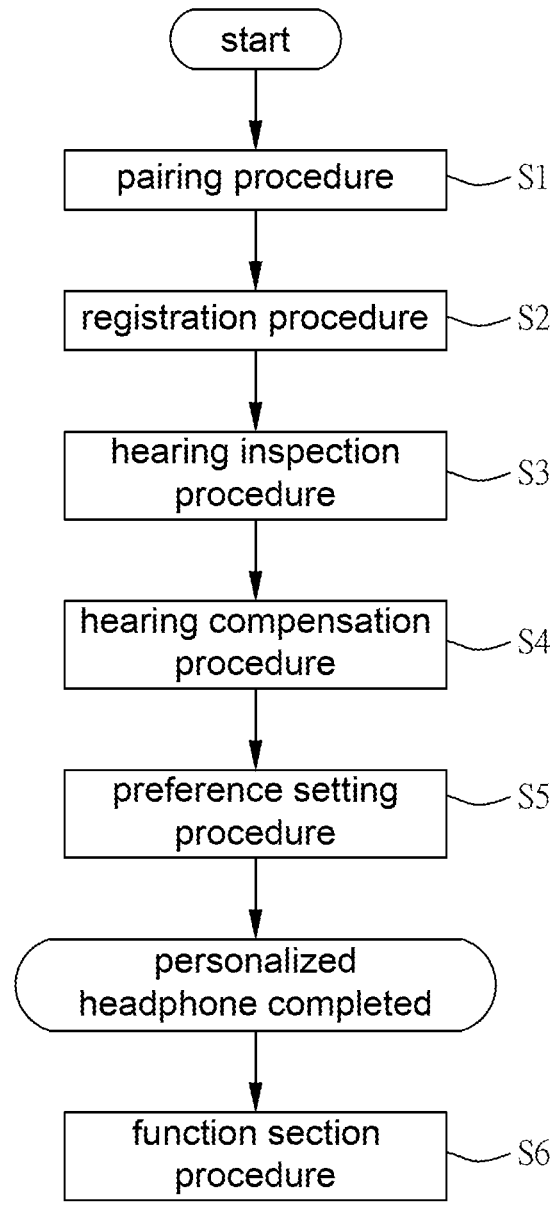
FIG. 8 is flow chart illustrating a method for using the smart headphone device personalization system with directional conversation function according to the present invention.

Further referring to FIG. 8, a method for using the smart headphone device personalization system with directional conversation function according to the present invention is illustrated, comprising at least the following steps: Step one (S1), a user downloading a headphone personalization application program unit from a server device for installation in a mobile device (which can be a mobile device that is for example a smart phone, a tablet computer, and the likes) and for pairing the mobile device with a smart headphone device to complete a pairing procedure; Step two (S2), conducting a registration procedure, wherein the user enters corresponding data through the register module of the mobile device; Step three (S3), conducting a hearing inspection procedure, wherein the user wears the smart headphone device and a hearing inspection module of the mobile device is put into operation to inspect the hearing capabilities of left and right ears of the user and generate an inspection result; Step four (S4), conducting a hearing compensation procedure, wherein an automatic compensation unit of the smart headphone device is first operated to automatically carry out compensation according to the inspection result and then, the user operates a manual compensation module of the mobile device to carry out compensation; Step five (S5), conducting a preference setting procedure, wherein the user operates a preference setting module of the mobile device to adjust a sound effect mode, so that after the setting is done, personalization of the smart headphone device is completed; and Step six (S6), conducting a function selection procedure to allow the user to make selection, through a function selection module, among the functions provided by the smart headphone device for selecting the directional conversation function so that the already-personalized smart headphone device may receive, through the at least one arrayed sound receiving unit arranged on the smart headphone device, sounds from the front side of the user to be converted, through the signal processing unit, into a second signal, which is transmitted by the central processing unit to a signal magnifying unit for magnification for subsequent broadcasting with a headphone unit to allow the user to clearly hear the sounds from the front side of the user.

A detailed description is provided below:

Firstly, after the mobile device 300 and the smart headphone device 400 complete the pairing procedure S1, a registration procedure S2 is then carried out, wherein the register module 21 comprises at least one data field to allow the user to make entry of data thereto (as shown in FIG. 3), and the data field comprises user name, password, re-entry of password, gender, age, occupation, and serial number of smart headphone device 400. The user must complete entry of each piece of data into the data field to complete registration.

After completion of the registration procedure S2, hearing inspection must be done on the user so that a hearing inspection procedure S3 is carried out, wherein the hearing inspection procedure S3 further comprises a standby state and an inspection state, wherein in the standby state (as shown in FIG. 4A), a level of volume of the smart headphone device 400 is turned down to the minimum and the noise sampling unit 47 of the smart headphone device 400 is adjusted to a predetermined position in order to detect the environmental noises and the signal processing unit 49 of the smart headphone device 400 converts the environmental noises into a first signal that is fed to the central processing unit 41 of the smart headphone device 400 to allow the first signal to be transmitted by the second transmission unit 42 of the smart headphone device 400 to the mobile device 300, wherein when the environmental noise is detected to be of a relative low level, switching is made to the inspection state, or otherwise, when the environmental noise is detected to be of a relatively high level, no switching is made to the inspection state. In switching to the inspection state (as shown in FIGS. 4B and 4C), the user will hear, through the smart headphone device 400, audio signals issued from the mobile device 300, wherein the frequency or volume is different among the audio signals and the user is allowed to hear the audio signal each time with just one ear. The user, upon hearing the audio signal, actuates a confirmation button on the mobile device 300 (such as the "confirmation" button shown in FIGS. 4B and 4C) to issue a confirmation message, and the mobile device 300 will then issue an audio signal having a different frequency or volume from that audio signal. After several times of inspection so conducted, the inspection result will be shown on the mobile device 300 (such as the hearing curves of left and right ears shown in FIG. 4D), and the inspection result is stored in the storage unit 45 and uploaded through the mobile device 300 to the server device 100 for storage therein.

Thus, after both ears of the user have been inspected and the inspection result have been generated, the hearing compensation procedure S4 is then conducted, wherein firstly, the automatic compensation unit 44 of the smart headphone device 400 carries out automatic compensation according to the inspection result and is pre-set with a listening volume and the user carries out further compensation with the manual compensation module 23 of the mobile device 300, wherein the hearing compensation procedure S4 further comprises auditory curve compensation, auditory threshold sensitivity compensation, balance compensation (as shown in FIG. 5A), and position recognition compensation (as shown in FIG. 5B). The auditory curve compensation and the auditory threshold sensitivity compensation are automatic compensation conducted with the automatic compensation unit 44, for example for minute adjustment for trend and the headphone personalization application program unit 200 automatically determining which ear is taken as reference, wherein if the inspection result indicates treble of the right ear and bass of the left ear are normal, then compensation can be made just for bass of the right ear and treble of the left ear; the balance compensation and the position recognition compensation are compensation conducted with the manual compensation module 23 by the user, allowing the user to do minute adjustment to such an extent that sound is perceived as emission from a center of the head, and then one segment of music that has been compensated and one segment of music that has not been compensated will be played to the user so that the user may determine if to activate the compensation function (as shown in FIG. 5C).

The preference setting procedure S5 is carried out finally. The user, based on his or her preference, operates the preference setting module 24 of the mobile device 300 to adjust a sound effect mode (as shown in FIG. 6), wherein the sound effect mode comprises news mode, classic mode, fashion mode, rock-and-roll mode, and heavy bass mode to be selected by the user. The personalization of the smart headphone device 400 is completed after the setting is done. Thus, the method for using can be applied to make the smart headphone device 400 correct the hearing of the user. When the user has the personalization-completed smart headphone device 400 connected with a sound playing device, such as a mobile device, a tabletop computer, a notebook computer, or a portable playing device, to listen to music or radio broadcasting, since any issue caused by hearing difference between the two ears of the user has been overcome, it is not necessary to frequently adjust the sound volume and it is also possible to avoid any consequence of deafness caused by listing to music with improper sound volume applying to the ears, and the frequency band of music listening can be adjusted according to the user's preference to allow the user to listen to music in a comfortable and easy condition and to achieve a good effect of music listening.

Figure 9:
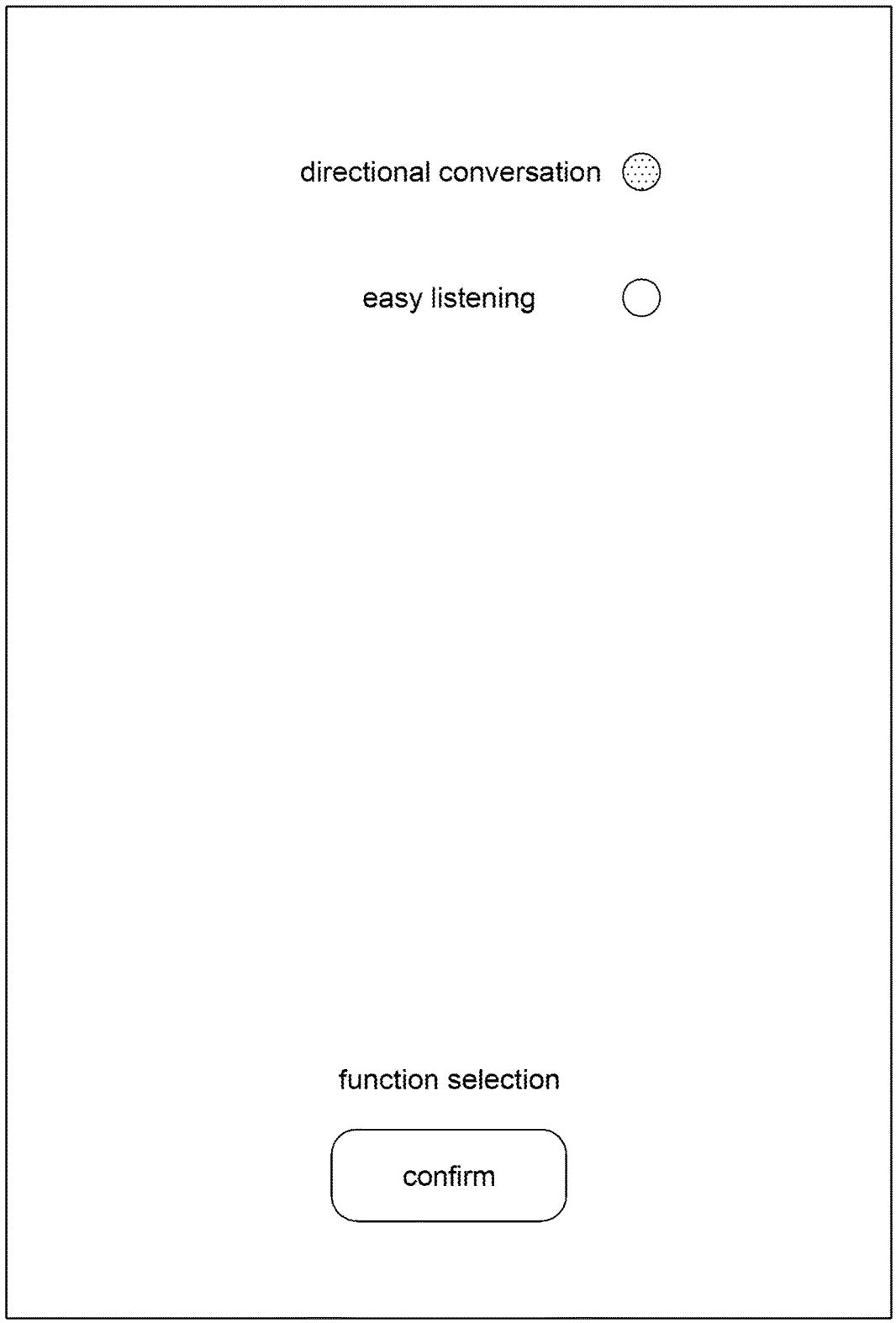
FIG. 9 is a schematic view illustrating operation of a function selection module with the method for using the smart headphone device personalization system with directional conversation function according to the present invention.

Next, the arrayed sound receiving unit 48 comprises a plurality of sound receiver microphones 481 of directivity (such as a cardioids microphone) that are fixed on a brace member 401 of the smart headphone device 400 (such as a circumaural headphone) so that the user may make selections, through the function selection module 25, among the functions provided by the smart headphone device 400, as shown in FIG. 9, wherein the functions comprise a directional conversation function and an easy listening function between which switching can be made by the user. The directional conversation function is such that sounds of a person staying in front of the user to chat with the user are received and collected by the arrayed sound receiving unit 48 and are converted by the signal processing unit 49 into the second signal so as to allow the central processing unit 41 to feed the second signal to the signal magnifying unit 50 for magnification and then broadcast through the headphone unit 43 to make the user clearly hear the sounds from the front side while omitting the surrounding sounds. The easy listening function is such that the noise sampling unit 47 makes sampling of the external environmental noise for transmission to the signal processing unit 49 for analysis and generation of an analysis signal, and then, the central processing unit 41 makes adjustment, according to the analysis signal, on the broadcasting volume of the headphone unit 43 so that when variation occurs on the environmental noise (such as the noise being increased or decreased) during the user listening to music, the smart headphone device 400 may timely adjust the volume of broadcasting (volume being increased or decreased) made by the headphone unit 43 in order to allow the user to listen to music easily and clearly.

In summary, the present invention provides a smart headphone device personalization system with directional conversation function and a method for using the system, in which a server device, a headphone personalization application program unit, a mobile device, and a smart headphone device are operated according to the way of use thereof (pairing, registration, hearing inspection, hearing compensation, and preference setting) to establish and configure a smart headphone device exclusively for the user according to the hearing condition and preference of the user. When the user wears the personalized smart headphone device to listen to music, since issues caused by hearing difference between the two ears of the user have been overcome, it is not necessary to frequently adjust the sound volume and it is also possible to avoid any consequence of deafness caused by listing to music with improper sound volume applying to the ears, and the frequency band of music listening can be adjusted according to the user's preference to allow the user to listen to music in a comfortable and easy condition. Further, the directional conversation function of the already-personalized smart headphone device is operable to magnify the sounds from a person in conversation therewith in front of the user so that the user may clearly hear the contents of conversation made by the person to thereby improve convenience of conversation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A smart headphone device personalization system with directional conversation function, comprising:
   a server device, the server device comprising therein a headphone personalization application program unit, the headphone personalization application program unit comprising a register module, a hearing inspection module, a manual compensation module, a preference setting module, and a function selection module, wherein:
   the register module allows a user to enter corresponding data for registration;
   the hearing inspection module allows the user to carry out hearing inspection and generates an inspection result;
   the manual compensation module allows the user to carry out manual compensation according to the inspection result;
   the preference setting module allows the user to adjust a sound effect mode according to personal preference, so that when the setting is done, a personalized setting that is fit to the hearing of the user is provided; and
   the function selection module, which allows a user to make selection of functions provided by a smart headphone device, wherein the functions comprise a directional conversation function;
   a mobile device, which is connected, through a first transmission unit, to a network to downward, from the server device, the headphone personalization application program unit for installation in the mobile device; and
   the smart headphone device, comprising:
      a central processing unit;
      a second transmission unit, which is electrically connected with the central processing unit in order to receive, through pairing between the second transmission unit and the first transmission unit, an instruction transmitted from the mobile device for transmission to the central processing unit, such that the central processing unit converts the instruction into a corresponding signal;
      a headphone unit, which is electrically connected with the central processing unit so that the headphone unit gives off the corresponding signal to be listened to by the user;
      an automatic compensation unit, which is electrically connected with the central processing unit and carries out automatic compensation according to the inspection result generated by the hearing inspection module;

a storage unit, which is electrically connected with the central processing unit for storing the personalized setting in the storage unit;

a power supply unit, which is electrically connected with the central processing unit to supply electrical power necessary for the smart headphone device;

at least a noise sampling unit, which is adapted to receive and collect an external environmental noise to carry out inspection of the environmental noise;

at least one arrayed sound receiving unit, which is electrically connected to the central processing unit and is arranged on the smart headphone device such that the arrayed sound receiving unit faces a front side of the user to receive and collect a sound front the front side of the user;

a signal processing unit, which is electrically connected to the noise sampling unit, the arrayed sound receiving unit, and the central processing unit to convert the environmental noise into a first signal, converting the sound from the front side of the user into a second signal, and transmitting the first and second signals to the central processing unit; and a signal magnifying unit, which is electrically connected with the central processing unit and the headphone unit to magnify the second signal and feed the magnified second signal to the headphone unit to be broadcast through the headphone unit, so that the user is allowed to clearly hear the sound from the front side of the user;

wherein the directional conversation function is operable to cause the smart headphone device to receive the sound from the front side of the user through the arrayed sound receiving unit, convert the sound into the second signal through the signal processing unit, transmit the second signal to the signal magnifying unit by the central processing unit, and magnify the second signal and feed the magnified second signal to the headphone unit by the signal magnifying unit.

2. The smart headphone device personalization system with directional conversation function according to claim 1, wherein the arrayed sound receiving unit comprises a plurality of sound receiver microphones of directivity, the sound receiver microphones being arranged on a brace member of the smart headphone device to receive and collect the sound from the front side of the user.

3. The smart headphone device personalization system with directional conversation function according to claim 2, wherein the sound receiver microphones are cardioids microphones.

4. The smart headphone device personalization system with directional conversation function according to claim 1, wherein the smart headphone device comprises a circumaural headphone.

5. The smart headphone device personalization system with directional conversation function according to claim 2, wherein the smart headphone device comprises a circumaural headphone.

6. The smart headphone device personalization system with directional conversation function according to claim 1, wherein the smart headphone device further comprises a satellite positioning unit, the satellite positioning unit being electrically connected with the central processing unit, the satellite positioning unit being operable to acquire a site where the smart headphone device is currently located for subsequent transmission to the central processing unit.

7. The smart headphone device personalization system with directional conversation function according to claim 1, wherein the register module comprises at least one data field for data entry by a user.

8. The smart headphone device personalization system with directional conversation function according to claim 7, wherein the data field comprises user name, password, re-entry of password, gender, age, occupation and smart headphone device serial number.

9. The smart headphone device personalization system with directional conversation function according to claim 1, wherein the functions provided by the smart headphone device further comprises an easy listening function.

10. A method for using a smart headphone device personalization system with directional conversation function, comprising at least the following steps:

Step 1: a user downloading a headphone personalization application program unit from a server device for installation in a mobile device for pairing the mobile device with a smart headphone device to complete a pairing procedure;

Step 2: conducting a registration procedure, wherein the user enters corresponding data through a register module of the mobile device;

Step 3: conducting a hearing inspection procedure, wherein the user wears the smart headphone device and a hearing inspection module of the mobile device is put into operation to inspect hearing capabilities of left and right ears of the user and generate an inspection result; wherein the hearing inspection procedure further comprises a standby state and an inspection state;

wherein in the standby state, a level of volume of the smart headphone device is turned down to a minimum value and the sampling unit of the smart headphone device is adjusted to a predetermined position in order to detect an environmental noise, a signal processing unit of the smart headphone device converting the environmental noise into a first signal to be transmitted to a central processing unit of the smart headphone device, a second transmission unit of the smart headphone device transmitting the first signal to a mobile device, wherein when the environmental noise is detected to be of a relatively low level, switching is made to the inspection state, or otherwise, when the environmental noise is detected to be of a relatively high level, no switching is made to the inspection state;

Step 4: conducting a hearing compensation procedure, wherein an automatic compensation unit of the smart headphone device is first operated to automatically carry out compensation according to the inspection result and then, the user operates a manual compensation module of the mobile device to carry out compensation;

Step 5: conducting a preference setting procedure, wherein the user operates a preference setting module of the mobile device to adjust a sound effect mode, so that after the setting is done, personalization of the smart headphone device is completed; and Step 6: conducting a function selection procedure to allow the user to make selection, through a function selection module, among functions provided by the smart headphone device for selecting a directional conversation function so that the already-personalized smart headphone device is operable to receive, through at least one arrayed sound receiving unit arranged on the smart headphone device, a sound from a front side of the user to be converted, through a signal processing unit, into a second signal, which is transmitted by a central processing unit to a signal magnifying unit to be subsequently broadcast through a headphone unit to allow the user to clearly hear the sound from the front side of the user.

11. The method for using the smart headphone device personalization system with directional conversation function according to claim 10, wherein the arrayed sound receiving unit comprises a plurality of sound receiver microphones of directivity, the sound receiver microphones being arranged on a brace member of the smart headphone device to receive and collect the sound from the front side of the user.

12. The method for using the smart headphone device personalization system with directional conversation function according to claim 11, wherein the sound receiver microphones are cardioids microphones.

13. The method for using the smart headphone device personalization system with directional conversation function according to claim 10, wherein the smart headphone device comprises a circumaural headphone.

14. The method for using the smart headphone device personalization system with directional conversation function according to claim 11, wherein the smart headphone device comprises a circumaural headphone.

15. The method for using the smart headphone device personalization system with directional conversation function according to claim 10, wherein the register module comprises at least one data field for data entry by a user.

16. The method for using the smart headphone device personalization system with directional conversation function according to claim 15, wherein the data field comprises user name, password, re-entry of password, gender, age, occupation and smart headphone device serial number.

17. The method for using the smart headphone device personalization system with directional conversation function according to claim 10, wherein in the inspection state, the user hears through the smart headphone device audio signals issued from the mobile device, wherein the user is allowed to hear the audio signal each time with just one ear, wherein the user, upon hearing the audio signal, actuates a confirmation button on the mobile device to issue a confirmation message, and the mobile device subsequently issue a next one of audio signal having a different frequency or volume, wherein after multiple times of inspection, an inspection result is displayed on the mobile device and the inspection result is stored in a storage unit included in the smart headphone device and uploaded through the mobile device to the server device for storage.

18. The method for using the smart headphone device personalization system with directional conversation function according to claim 17, wherein after the inspection of both ears of the user is done and the inspection result is generated, then the hearing compensation procedure is conducted, wherein the hearing compensation procedure further comprises auditory curve compensation, auditory threshold sensitivity compensation, balance compensation, and position recognition compensation, wherein the auditory curve compensation and the auditory threshold sensitivity compensation are automatic compensation conducted with the automatic compensation unit and the balance compensation and the position recognition compensation are compensation conducted with the manual compensation module by the user.

19. The method for using the smart headphone device personalization system with directional conversation function according to claim 10, wherein the sound effect mode comprises news mode, classic mode, fashion mode, rock-and-roll mode, and heavy bass mode to be selected by the user.

20. The method for using the smart headphone device personalization system with directional conversation function according to claim 10, wherein the functions provided by the smart headphone device further comprise an easy listening function.

* * * * *